United States Patent
Long, III

(10) Patent No.: US 10,914,427 B2
(45) Date of Patent: Feb. 9, 2021

(54) AUTOMATED PIPELINE CHEMICAL BATCH TREATMENT

(71) Applicant: Oil and Gas Solutions, LLC, Spring, TX (US)

(72) Inventor: Robert J. Long, III, Spring, TX (US)

(73) Assignee: OIL AND GAS SOLUTIONS, LLC, Spring, TX (US)

(*) Notice: Subject to any disclaimer, the term of this patent is extended or adjusted under 35 U.S.C. 154(b) by 0 days.

(21) Appl. No.: 16/738,263

(22) Filed: Jan. 9, 2020

(65) Prior Publication Data
US 2020/0292136 A1    Sep. 17, 2020

Related U.S. Application Data

(60) Provisional application No. 62/872,484, filed on Jul. 10, 2019, provisional application No. 62/818,272, filed on Mar. 14, 2019.

(51) Int. Cl.
*F17D 5/02* (2006.01)
*G05B 23/02* (2006.01)
(Continued)

(52) U.S. Cl.
CPC .............. *F17D 5/02* (2013.01); *F16L 55/46* (2013.01); *G05B 19/0428* (2013.01);
(Continued)

(58) Field of Classification Search
CPC ..... F17D 5/02; G05B 19/0428; G05B 23/021; G05B 23/0216; G05B 2223/06;
(Continued)

(56) References Cited

U.S. PATENT DOCUMENTS 7,647,136 B2 * 1/2010 McDowell ................ F17D 3/01
                                                                  700/282
8,765,061 B2 * 7/2014 Tunheim ................ G01N 21/27
                                                                  422/82.05
(Continued)

FOREIGN PATENT DOCUMENTS

WO    WO-2015174995 A1 * 11/2015  ............... C09K 8/54
WO    WO-2015174996 A1 * 11/2015  ............. C09K 8/524

OTHER PUBLICATIONS

Cordell, J.; Vanzant, H. The pipeline pigging handbook; Clarion Technical Publishers: Place of publication not identified, 2003. (Year: 2003).*
Internal Pipeline Cleaning. https://www.mogsil.com/in-situ/pipeline-cleaning/ May 27, 2011, retrieved from https://web.archive.org/web/20110527045551/https://www.mogsil.com/in-situ/pipeline-cleaning/ (accessed Mar. 10, 2020), (Year: 2011).*
(Continued)

*Primary Examiner* — William P Fletcher, III
(74) *Attorney, Agent, or Firm* — Angelo IP; Basil M. Angelo

(57) ABSTRACT

A method of automated pipeline chemical batch treatment includes receiving treatment information at a control system of a pipeline. If the treatment information includes an instruction to activate a pump system, the method includes transmitting an activation signal from the control system to the pump system in accordance with the treatment information. The activation signal causes the pump system to pump one or more chemicals from a chemical feed system into the pipeline. If the treatment information includes an instruction to deactivate the pump system, the method includes transmitting a deactivation signal from the control system to the pump system in accordance with the treatment information, wherein the deactivation signal causes the pump system to stop pumping one or more chemicals from the chemical feed system into the pipeline.

36 Claims, 4 Drawing Sheets

(51) Int. Cl.
*F16L 55/46* (2006.01)
*G05B 19/042* (2006.01)
*F16L 58/02* (2006.01)
*B05D 7/22* (2006.01)

(52) U.S. Cl.
CPC ....... *G05B 23/021* (2013.01); *G05B 23/0216* (2013.01); *B05D 7/225* (2013.01); *B05D 2254/04* (2013.01); *F16L 58/02* (2013.01); *G05B 2223/06* (2018.08)

(58) Field of Classification Search
CPC .......... F16L 55/46; F16L 58/02; B05D 7/225; B05D 2254/04
See application file for complete search history.

(56) References Cited

U.S. PATENT DOCUMENTS

| | | | | |
|---|---|---|---|---|
| 10,352,505 B2* | 7/2019 | McDowell | .......... | G01M 3/2815 |
| 10,633,953 B2* | 4/2020 | Abou-Sayed | ....... | E21B 41/0092 |
| 2016/0377232 A1* | 12/2016 | Boker | ....................... | F16L 1/06 |
| | | | | 709/217 |

OTHER PUBLICATIONS

Starikov, D. P.; Rybakov, E. A.; Gromakov, E. I. The Pipeline Oil Pumping Engineering Based on the Plant Wide Control Technology. IOP Conference Series: Materials Science and Engineering 2015, 81, 012111. (Year: 2015).*

Schweder, J. Safer Pipelines Depend on Advanced Automation. https://www.automationworld.com/products/control/article/13317606/safer-pipelines-depend-on-advanced-automation (accessed Mar 10, 2020). (Year: 2017).*

Lewellen, M. M.; Council, J. M. Offshore Corrosion Control Program For Platforms, Pipeline And Production Equipment. Offshore Technology Conference 1975. (Year: 1975).*

Coasasco, Microcor High Resolution Corrosion Monitoring System presentation slide deck, publication date unknown, pp. 1-37, publisher unknown, publication location unknown.

Rohrback Cosasco Systems, Inc., Model 3500 & 3500HT Cylindrical Element Retractable Corrosometer Probe User Manual, publication date unknown, pp. 1-7, publisher unknown, publication location unknown.

Sensor Networks, Inc., microPIMs presentation slide deck, publication date unknown, pp. 1-20, publisher unknown, publication location unknown.

* cited by examiner

AUTOMATED PIPELINE CHEMICAL BATCH TREATMENT

BACKGROUND OF THE INVENTION

A pipeline is a midstream conduit system that transports fluids from upstream producing areas to downstream storage terminals, processing facilities, or refineries. In the energy industry, there are two primary types of pipelines in common use: liquid pipelines and natural gas pipelines. Liquid pipelines typically convey crude oil, liquified natural gas, or other petroleum products. Natural gas pipelines typically convey dry natural gas. In conventional applications, a highly integrated network of pipelines facilitates the transport of oil and gas. For example, gathering pipelines, sometimes referred to as flow lines or gathering lines, transport crude oil or natural gas from the production site to storage terminals or processing facilities. They typically have relatively small inner diameters and operate at relatively low pressures and flow rates. Feeder pipelines are typically used to connect storage terminals or processing facilities to long-distance transmission pipelines. Transmission pipelines then transport crude oil or natural gas from storage terminals or processing facilities to refineries or distribution centers, typically traversing long distances. Transmission pipelines typically have large inner diameters and operate at higher pressures and flow rates. A typical pipeline segment includes one or more pipe sections, fittings, and flanges configured to facilitate fluid flow from end-to-end through the inner diameter of the pipe. In liquid pipelines, pump stations may be deployed along the pipeline to generate the fluid pressure that drives the fluids through the system. In natural gas pipelines, compressor stations may be used to generate the driving force.

Pipe sections, and by extension the pipeline itself, are prone to corrosion due to reactions occurring both outside and within the pipeline. Internal corrosion refers to the deterioration of the internal surfaces of the pipeline due to acid gas reactions, microbiological factors, stray current interference, and other reactions taking place within the pipeline. Corrosion may be localized under deposits affixed to the internal surfaces of the pipeline or impact the internal surfaces of the pipeline generally. Internal corrosion accounts for the majority of pipeline incidents caused by corrosion. Left untreated, internal corrosion can result in the localized loss of metal reducing wall thickness and over time can potentially result in pinhole leaks, cracks, or ruptures. In addition, internal corrosion can weaken the pipe making it more susceptible to other failure modes including overpressure events, leakage due to earth movement, and external stresses. As such, internal corrosion of pipelines transporting hazardous materials is closely regulated and monitored for compliance to ensure the safety of the public and the environment.

In the United States, a number of federal and state agencies regulate interstate and intrastate pipelines. For example, interstate pipelines are regulated by the Federal Energy Regulatory Commission ("FERC") and the Department of Transportation ("DOT"). Once a pipeline is operational, the DOT's Pipeline and Hazardous Material Safety Administration ("PHMSA"), acting through the Office of Pipeline Safety ("OPS"), monitors and enforces safety regulations. Although the federal government is responsible for developing and enforcing interstate pipeline safety regulations, inspections are typically conducted by state regulatory agencies certified by PHMSA or OPS, which monitor for compliance with state regulations that must be at least as stringent as the federal regulations. Federal pipeline safety regulations require pipeline operators to adopt a pipeline integrity management program that includes continually inspecting and assessing the integrity of their pipelines for internal corrosion and other integrity issues that could potentially impact populated or environmentally sensitive areas.

BRIEF SUMMARY OF THE INVENTION

According to one aspect of one or more embodiments of the present invention, a method of automated pipeline chemical batch treatment includes receiving treatment information at a control system of a pipeline, if the treatment information comprises an instruction to activate a pump system, transmitting an activation signal from the control system to the pump system in accordance with the treatment information, wherein the activation signal causes the pump system to pump one or more chemicals from a chemical feed system into the pipeline, and if the treatment information comprises an instruction to deactivate the pump system, transmitting a deactivation signal from the control system to the pump system in accordance with the treatment information, wherein the deactivation signal causes the pump system to stop pumping one or more chemicals from the chemical feed system into the pipeline.

According to one aspect of one or more embodiments of the present invention, a method of automated pipeline chemical batch treatment includes receiving treatment information comprising activation criteria and deactivation criteria at a control system of a pipeline, activating a pump system in accordance with the activation criteria, and deactivating the pump system in accordance with the deactivation criteria.

According to one aspect of one or more embodiments of the present invention, an automated pipeline chemical batch treatment system includes a control system for a pipeline that receives treatment information, a chemical feed system comprising one or more chemicals, and a pump system in fluid communication with the pipeline and the chemical feed system. The control system controllably instructs the pump system to pump one or more chemicals from the chemical feed system into the pipeline in accordance with the treatment information.

Other aspects of the present invention will be apparent from the following description and claims.

DETAILED DESCRIPTION OF THE INVENTION

Figure 1:
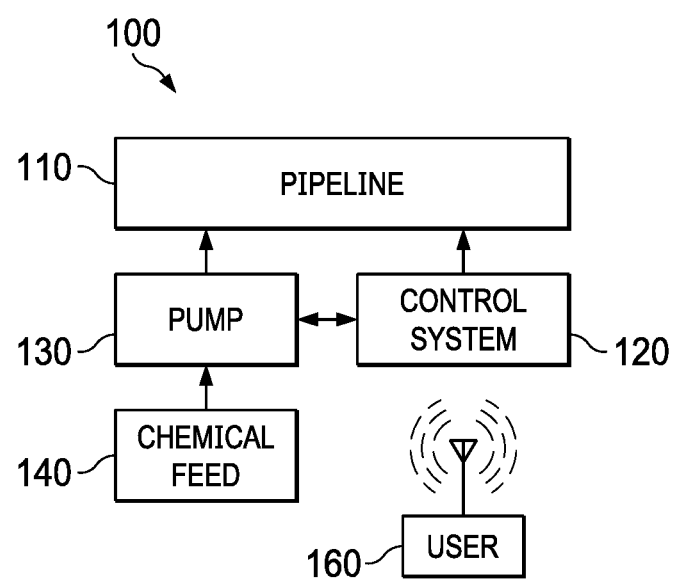
FIG. 1 shows an automated pipeline chemical batch treatment system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

As previously discussed, operators are required to inspect and assess the integrity of pipeline assets to ensure the safety of operations and to mitigate environmental risks they potentially pose if not properly maintained. Notwithstanding, economic factors also motivate operators to preventatively maintain pipeline assets. If a pipe section requires maintenance, repair or replacement operations are difficult, time-consuming, and expensive and require that the operator take the pipeline offline resulting in non-productive downtime and potentially exposing the environment to fouling. As such, operators have a vested economic interest in maintaining the safe and operational status of their pipeline assets. To that end, operators typically implement pigging and chemical treatment operations throughout the lifetime of the asset including prior to commissioning, during the operational life of the pipeline, maintenance, and prior to decommissioning.

During operational use, deposits may precipitate out of solution or accumulate over time within the pipeline resulting in built-up deposits on the internal walls of the pipeline that restrict or potentially even block flow. In addition, deposits promote the development of under-deposit corrosion that is not treatable until the deposit is dislodged. Pigging operations are typically used to clean the pipeline by inserting a pipeline pig into a pig launcher, creating a pressure differential, and propelling the pig through the pipeline to dislodge deposits within the inner diameter. Pipeline pigs are typically cylindrical and sometimes spherical in shape and are sized to substantially match the inner diameter of the pipeline. In large diameter pipelines, the pipeline pigs typically include a mandrel and a plurality of tools disposed along the length of the mandrel, including, for example, gauge plates, brushes, and scrapers. Smart and specialty pipeline pigs include instrumentation, including, for example, magnetic flux leakage, electromagnetic acoustic transduction, and navigation tools that gather information about the state of the pipeline as the pig is being propelled through the pipeline. Because pigging operations are intended to provide flow assurance, pigging operations are often accompanied by, or sequenced with, chemical treatment operations. Chemical treatment operations include the introduction of various chemistries into the inner diameter of the pipeline including, for example, one or more inhibitors (e.g., corrosion, paraffin, asphaltene), biocides (e.g., biocides, microbiological, biodispersants), scavengers (e.g., $H_2S$, $CO_2$, or oxygen), dissolvers (e.g., acids, chelants, iron dissolvers), surfactants, dispersants, cleaning agents, antifreeze (e.g., methanol, alcohols, and glycols), or other treatment-specific chemistries that seek to prevent corrosion, kill bacteria, remove deposits, or preventatively treat or coat the inner walls of the pipeline.

Batch treatment of pipelines has been shown to be more effective, by providing the right chemicals at the right time, and more economical, at least from a bill of material perspective, than continuous treatment because of the savings the periodic introduction of expensive chemicals into the pipeline provides over continuous injection. However, continuous treatment is favored in the industry due to a number of factors that presently weigh against the use of batching. For example, batching requires operational planning and scheduling, the deployment of pigging and chemical treatment personnel on site, and coordination and communication between pigging and chemical treatment personnel, along with a significant increase in safety risks. These burdens imposed by conventional batching drive up costs.

Accordingly, in one or more embodiments of the present invention, a method and system for automated pipeline chemical batch treatment automates the chemical feed system, and in some embodiments, pigging operations, in a manner that reduces or eliminates field operations that would otherwise have to be planned, coordinated, and performed on site, improves the safety and effectiveness of flow assurance and pipeline integrity operations, and reduces total operating costs. In certain embodiments, a control system of the pipeline may receive treatment information remotely from a user comprising instructions for chemical treatment actions to be performed. In other embodiments, one or more sensors or signalers may be used to automatically start or stop treatment. In still other embodiments, pigging operations may be used to automatically start or stop operations. Advantageously, field personnel do not have to be on site and the right chemicals may be provided at the right time and in the right amount, thereby improving up time, reducing maintenance, reducing safety risks, and reducing operating costs for moving oil and gas through the pipeline.

FIG. 1 shows an automated pipeline chemical batch treatment system 100 in accordance with one or more embodiments of the present invention. System 100 may include a conventional pipeline 110 comprising one or more pipe sections (not independently illustrated) that convey gas or fluids through an inside of the pipe section, sometimes referred to as a lumen or interior passageway formed within the inner diameter of the pipe sections (not independently illustrated). System 100 may also include a control system 120 for pipeline 110 that receives treatment information that may be used to control various aspects of the operation of pipeline 110. For example, control system 120 may receive treatment information, as discussed in more detail herein, and use the treatment information to control the operation of a pump system 130 in fluid communication with pipeline 110 and a chemical feed system 140 to controllably deliver one or more chemicals (not shown) from chemical feed system 140 to the inside of pipeline 110. Chemical feed system 140 may include one or more tanks (not independently illustrated) that contain different treatment chemistries. As such, control system 140 may controllably activate pump system 130 to pump one or more chemicals (not shown) from chemical feed system 140 into pipeline 110 and deactivate in accordance with the treatment information.

In one or more embodiments of the present invention, a method of automated pipeline chemical batch treatment includes receiving treatment information at a control system 120 of pipeline 110. In certain embodiments, receiving treatment information may include receiving treatment information from a remote user 160 via cellular, satellite, radio, wireless Supervisory Control and Data Acquisition ("SCADA"), or other wireless communication. As such, user 160 may transmit treatment information to control system 120 from a remote location using a cell phone (not shown), a tablet (not shown), a laptop computer (not shown), or other device (not shown) capable of wirelessly transmitting the treatment information, directly or indirectly, to control system 120. For example, in certain applications, user 160 may input treatment information using a software application (not shown) that is transmitted wirelessly to control system 120. In other embodiments, receiving treatment information may include receiving treatment information from a local user 160 via an input device (not shown) of control system 120.

In certain embodiments, treatment information may include one or more of an instruction to activate pump system 130 and an instruction to deactivate pump system 130. In other embodiments, treatment information may include an instruction to activate pump system 130 and an instruction to deactivate pump system 130 after a predetermined amount of time has elapsed. In still other embodiments, treatment information may include an instruction to activate pump system 130 and an instruction to deactivate pump system 130 after a predetermined amount of one or more chemicals (not shown) from the chemical feed system 140 have been deployed into the lumen of pipeline 110. Pump system 130 may provide control system 120 with information used by control system 120, directly or indirectly, to determine if the predetermined amount has been deployed. For example, pump system 130 may provide an amount of flow therethrough directly used by control system 120 or information relating to activation and deactivation and a flow rate that may be used by control system 120 to calculate whether the predetermined amount has been deployed.

In certain embodiments, treatment information may include a time or a time and date for control system 120 to send an activation signal to pump system 130. In other embodiments, treatment information may include a time or a time and date for control system 120 to send a deactivation signal to pump system 130. In still other embodiments, treatment information may include a time to deactivate pump system 130 that is a predetermined amount of time after activation. In still other embodiments, treatment information may include a directive to deactivate pump system 130 after a predetermined amount of one or more chemicals (not shown) have been deployed into pipeline 110.

If the treatment information includes an instruction to activate pump system 130, control system 120 may transmit an activation signal from control system 120 to pump system 130 in accordance with the treatment information that causes pump system 130 to pump one or more chemicals (not shown) from chemical feed system 140 into pipeline 110. Similarly, if the treatment information includes an instruction to deactivate pump system 130, control system 120 may transmit a deactivation signal from control system 120 to pump system 130 in accordance with the treatment information that causes pump system 130 to stop pumping one or more chemicals (not shown) into pipeline 110. Control system 120 may transmit the activation and deactivation signals to pump system 130 over a wired or wireless connection.

The activation signal may cause pump system 130 to start pumping one or more chemicals (not shown) from chemical feed system 140 into the lumen of pipeline 110. One of ordinary skill in the art will recognize that the form or protocol of the activation signal may vary with the type or kind of control system 120 and pump system 130 used in accordance with one or more embodiments of the present invention. Similarly, the deactivation signal may cause pump system 130 to stop pumping one or more chemicals (not shown) from chemical feed system 140 into the lumen of pipeline 110. One of ordinary skill in the art will also recognize that the form or protocol of the deactivation signal may vary with the type or kind of control system 120 and pump system 130 used in accordance with one or more embodiments of the present invention.

Figure 2:
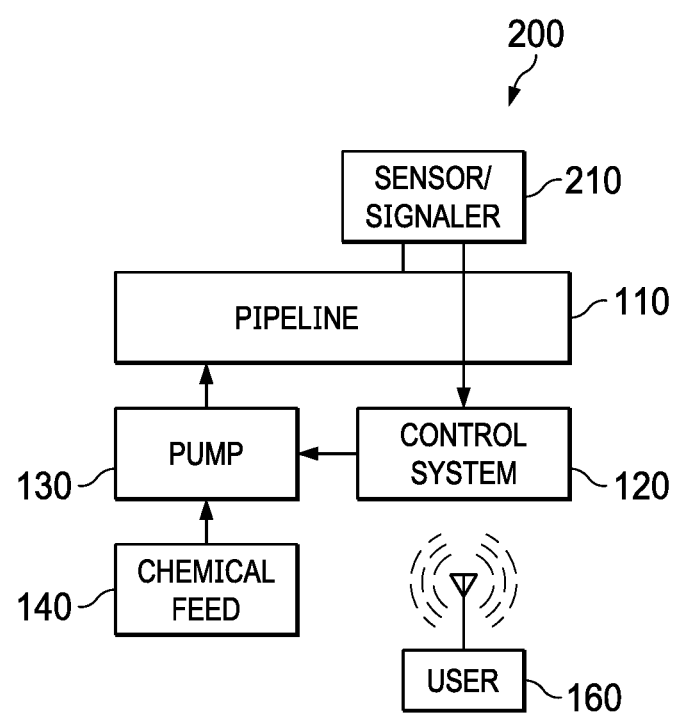
FIG. 2 shows an automated pipeline chemical batch treatment system with one or more sensors or signalers in accordance with one or more embodiments of the present invention.

FIG. 2 shows an automated pipeline chemical batch treatment system 200 with one or more sensors or signalers 210 in accordance with one or more embodiments of the present invention. System 200 may include a conventional pipeline 110 comprising one or more pipe sections (not independently illustrated) that convey gas or fluids through a lumen formed within the inner diameter of the pipe sections (not independently illustrated). System 200 may also include a control system 120 for pipeline 110 that receives treatment information that may be used to control various aspects of the operation of pipeline 110. For example, control system 120 may receive treatment information, as discussed in more detail herein, and use the treatment information to control the operation of a pump system 130 in fluid communication with pipeline 110 and a chemical feed system 140 to controllably deliver one or more chemicals (not shown) from chemical feed system 140 to the lumen of pipeline 110. Chemical feed system 140 may include one or more tanks (not independently illustrated) that contain different treatment chemistries. As such, control system 140 may controllably activate pump system 130 to pump one or more chemicals (not shown) from chemical feed system 140 into pipeline 110 and deactivate in accordance with the treatment information.

System 200 may include one or more sensors 210 disposed on, in, or near pipeline 110 as required for operative use. Sensors 210 may include one or more of a corrosion sensor, a pressure sensor, a temperature sensor, a wall thickness sensor, a fluid level sensor, an electrical resistance sensor, a magnetic flux leakage sensor, an electromagnetic acoustic transducer, a flow sensor, or any other sensor that provides relevant information relating to flow assurance and pipeline integrity. The one or more sensors 210 may transmit, through either a wired or wireless connection, their respective sensor information to control system 120. Control system 120 may use the received sensor information to automatically, or in conjunction with the user's 160 directive, generate treatment information and transmit activation or deactivation signals to pump system 130 in accordance with the treatment information. For example, in certain embodiments, sensor information indicating the presence of corrosion that exceeds a threshold value may automatically trigger control system 120 to initiate a batch treatment protocol with corrosion inhibiting chemicals. Advantageously, automation allows for the precise delivery of the right chemicals at the right time without on-site personnel and substantial cost savings over continuous injection. In other embodiments, sensor information may include information from one or more sensors 210 that are presented to user 160 with, for example, a suggested course of action or request for clarification, that user 160 may authorize or modify as user 160 sees fit. For example, control system 120 may receive sensor information and transmit to user 160 an alert or notification requesting authorization or clarification. The user 160, who may be remotely located, may view the relevant sensor information and information relating to pipeline 110 operations and transmit an authorization or a modification to the treatment information to control system 120, clarifying the user's 160 desired course of action.

System 200 may include one or more signalers 210 disposed on, in, or near pipeline 110 as required for operative use. Signalers 210 may include one or more of a pig signaler, a pump system signaler, or a chemical feed system signaler. One of ordinary skill in the art will recognize that, as opposed to sensors that sense, signalers convert a physical state or property into an actionable signal, whether mechanical or electrical, that ultimately becomes an electrical signal received by control system 120. The one or more signalers 210 may transmit, through either a wired or wireless connection, their respective signaler information to control system 120. Control system 120 may use the received signaler information, potentially in conjunction with received sensor information, to automatically, or in conjunction with the user's 160 directive, generate treatment information and transmit activation or deactivation signals to pump system 130 in accordance with the treatment information. For example, in certain embodiments, signaler information from a pig signaler may automatically trigger control system 120 to start or stop a batch treatment protocol. The signal information from the pig signaler may include, for example, information indicating that a pig (not shown) has launched down pipeline 110, information indicating that the pig (not shown) has passed a specific location of pipeline 110, or information indicating that the pig has been trapped and removed from pipeline 110. In other embodiments, signaler information corresponding to an operational state of pump system 130 may automatically trigger control system 120 to start or stop a batch treatment protocol. In still other embodiments, signaler information corresponding to a fluid level of one or more chemicals of the chemical feed system 140 may automatically trigger control system 120 to start or stop a batch treatment protocol. Advantageously, automation allows for the precise delivery of the right chemicals at the right time without on-site personnel and substantial cost savings over continuous injection. In other embodiments, signaler information may include information from one or more signalers that are presented to user 160 with, for example, a suggested course of action or request for clarification, that user 160 may authorize or modify as user 160 sees fit. For example, control system 120 may receive signaler information and transmit to user 160 an alert or notification requesting authorization or clarification. The user 160, who may be remotely located, may view the relevant sensor information and information relating to pipeline 110 operations and transmit an authorization or a modification to the treatment information to control system 120 clarifying the user's 160 desired course of action.

System 200 may include one or more sensors 210 and one or more signalers 210 disposed on, in, or near pipeline 110 as required for operative use. In certain embodiments, control system 120 may automatically generate treatment information based on one or more of sensor information and signaler information received. In other embodiments, control system 120 may generate treatment information based on one or more of sensor information, signaler information, and user 160 directives regarding prescribed courses of action based on sensor information and/or signaler information received. One of ordinary skill in the art will recognize that the generation of treatment information may vary based on the type or kind of treatment protocol to be implemented and the type or kind of available sensors 210, signalers 210, pump system 130, and chemical feed system 140 in accordance with one or more embodiments of the present invention.

In one or more embodiments of the present invention, a method of automated pipeline chemical batch treatment includes receiving treatment information at a control system 120 of pipeline 110. In certain embodiments, receiving treatment information may include receiving treatment information from a remote user 160 via cellular, satellite, radio, wireless SCADA, or other wireless communication. As such, user 160 may transmit treatment information to control system 120 from a remote location using a cell phone (not shown), a tablet (not shown), a laptop computer (not shown), or other device (not shown) capable of wirelessly transmitting the treatment information, directly or indirectly, to control system 120. For example, in certain applications, user 160 may input treatment information using a software application (not shown) that is transmitted wirelessly to control system 120. In other embodiments, receiving treatment information may include receiving treatment information from a local user 160 via an input device (not shown) of control system 120.

In certain embodiments, treatment information may include sensor information or signaler information received by control system 120. Sensor or signaler information may constitute or include activation or deactivation criteria. In certain embodiments, the activation or deactivation criteria may independently be actionable by control system 120. In other embodiments, control system 120 may generate additional treatment information based on the sensor or signaler information or the activation or deactivation criteria. For example, sensor information indicating a value associated with sensed corrosion, pressure, temperature, wall thickness, electrical resistance, magnetic flux leakage, electromagnetics, or other such data, may be calibrated such that control system 120 may treat such information as activation or deactivation criteria. For example, sensor information indicating pipe wall loss, deposition, or corrosion values that exceeds a threshold value may be treated as activation criteria. Similarly, pipe wall loss, deposition, or corrosion values that fall below a threshold value may be treated as deactivation criteria. Control system 120 may activate and deactivate pump system 130 in accordance with the activation and deactivation criteria. One of ordinary skill in the art will recognize that the values of the data, the thresholds that trigger action, and the actions taken, will vary based on the treatment protocol, application, and design in accordance with one or more embodiments of the present invention.

In certain embodiments, treatment information may include an instruction to activate pump system 130 in accordance with one or more activation criteria and an instruction to deactivate pump system 130 in accordance with one or more deactivation criteria. In other embodiments, treatment information may include an instruction to activate pump system 130 in accordance with one or more activation criteria and deactivate pump system 130 after a predetermined amount of time has elapsed. In still other embodiments, treatment information may include an instruction to activate pump system 130 in accordance with one or more activation criteria and deactivate pump system 130 after a predetermined amount of one or more chemicals (not shown) from the chemical feed system 140 have been deployed into the lumen of pipeline 110.

In certain embodiments, treatment information may include one or more of an instruction to activate pump system 130 and an instruction to deactivate pump system 130. In other embodiments, treatment information may include an instruction to activate pump system 130 and an instruction to deactivate pump system 130 after a predetermined amount of time has elapsed. In still other embodiments, treatment information may include an instruction to activate pump system 130 and an instruction to deactivate pump system 130 after a predetermined amount of one or more chemicals (not shown) from the chemical feed system 140 have been deployed into the lumen of pipeline 110. Pump system 130 may provide control system 120 with information used by control system 120, directly or indirectly, to determine if the predetermined amount has been deployed. For example, pump system 130 may provide an amount of flow therethrough directly used by control system 120 or information relating to activation and deactivation and a flow rate that may be used by control system 120 to calculate whether the predetermined amount has been deployed.

In certain embodiments, treatment information may include a time or a time and date for control system 120 to send an activation signal to pump system 130. In other embodiments, treatment information may include a time or a time and date for control system 120 to send a deactivation signal to pump system 130. In still other embodiments, treatment information may include a time to deactivate pump system 130 that is a predetermined amount of time after activation. In still other embodiments, treatment information may include a directive to deactivate pump system 130 after a predetermined amount of one or more chemicals (not shown) have been deployed into pipeline 110.

If the treatment information includes an instruction to activate pump system 130, control system 120 may transmit an activation signal from control system 120 to pump system 130 in accordance with the treatment information that causes pump system 130 to pump one or more chemicals (not shown) from chemical feed system 140 into pipeline 110. Similarly, if the treatment information includes an instruction to deactivate pump system 130, control system 120 may transmit a deactivation signal from control system 120 to pump system 130 in accordance with the treatment information that causes pump system 130 to stop pumping one or more chemicals (not shown) into pipeline 110. Control system 120 may transmit the activation and deactivation signals to pump system 130 over a wired or wireless connection.

The activation signal may cause pump system 130 to start pumping one or more chemicals (not shown) from chemical feed system 140 into the lumen of pipeline 110. One of ordinary skill in the art will recognize that the form or protocol of the activation signal may vary with the type or kind of control system 120 and pump system 130 used in accordance with one or more embodiments of the present invention. Similarly, the deactivation signal may cause pump system 130 to stop pumping one or more chemicals (not shown) from chemical feed system 140 into the lumen of pipeline 110. One of ordinary skill in the art will also recognize that the form or protocol of the deactivation signal may vary with the type or kind of control system 120 and pump system 130 used in accordance with one or more embodiments of the present invention.

Figure 3:
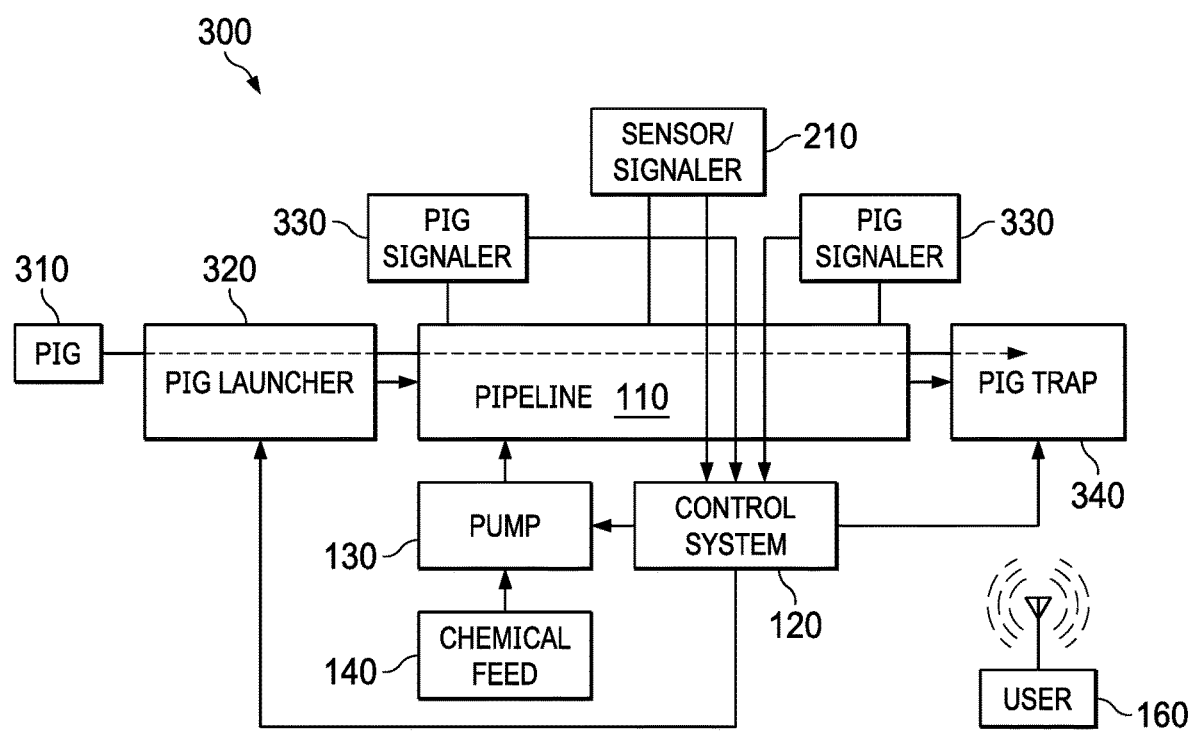
FIG. 3 shows an automated pipeline chemical batch treatment system with one or more sensors or signalers, a pig launcher, and a pig trap, in accordance with one or more embodiments of the present invention.

FIG. 3 shows an automated pipeline chemical batch treatment system 300 with one or more sensors or signalers 210, a pig launcher 320, and a pig trap 340 in accordance with one or more embodiments of the present invention. System 300 may include a conventional pipeline 110 comprising one or more pipe sections (not independently illustrated) that convey fluids through a lumen formed within the inner diameter of the pipe sections (not independently illustrated). System 300 may also include a control system 120 for pipeline 110 that receives treatment information that may be used to control various aspects of the operation of pipeline 110. For example, control system 120 may receive treatment information, as discussed in more detail herein, and use the treatment information to control the operation of a pump system 130 in fluid communication with pipeline 110 and a chemical feed system 140 to controllably deliver one or more chemicals (not shown) from chemical feed system 140 to the lumen of pipeline 110. Chemical feed system 140 may include one or more tanks (not independently illustrated) that contain different treatment chemistries. As such, control system 140 may controllably activate pump system 130 to pump one or more chemicals (not shown) from chemical feed system 140 into pipeline 110 and deactivate in accordance with the treatment information.

System 300 may include a pig launcher 320 used to launch a conventional pig 310 into pipeline 110, one or more pig signalers 330 disposed along a length of pipeline 110, and a pig trap 340 used to trap and remove pig 310 from pipeline 110. Pigging operations are typically used to clean the pipeline by inserting pig 310 into pig launcher 320, creating a pressure differential, and propelling the pig 310 through pipeline 110 to dislodge deposits within the inner diameter. Pig 310 may be typically cylindrical, spherical, or any other shape or size. In large diameter pipelines pig 310 may include a mandrel and a plurality of tools disposed along the length of the mandrel, including, for example, gauge plates, brushes, and scrapers. Because pigging operations are intended to provide flow assurance, pigging operations are often accompanied by, or sequenced with, chemical treatment operations. Pig launcher 320 may be instrumented to transmit via a wired or wireless connection, a pig launch signal to control system 120. Similarly, pig trap 340 may be instrumented to transmit, via a wired or wireless connection, a pig trap signal to control system 120. One or more pig signalers 330 may transmit, via a wired or wireless connection, one or more pig signaler signals to control system 120. Control system 120 may use one or more of the pig launch signal, the pig trap signal, or one or more pig signaler signals, either alone or in combination with sensor information, signaler information, or additional treatment information, received or generated, to controllably activate and deactivate pump system 130.

System 300 may include one or more sensors 210 disposed on, in, or near pipeline 110 as required for operative use. Sensors 210 may include one or more of a corrosion sensor, a pressure sensor, a temperature sensor, a wall thickness sensor, a fluid level sensor, an electrical resistance sensor, a magnetic flux leakage sensor, an electromagnetic acoustic transducer, a flow sensor, or any other sensor that provides relevant information relating to flow assurance and pipeline integrity. The one or more sensors 210 may transmit, through either a wired or wireless connection, their respective sensor information to control system 120. Control system 120 may use the received sensor information to automatically, or in conjunction with the user's 160 directive, generate treatment information and transmit activation or deactivation signals to pump system 130 in accordance with the treatment information. For example, in certain embodiments, sensor information indicating the presence of corrosion that exceeds a threshold value may automatically trigger control system 120 to initiate a batch treatment protocol with corrosion inhibiting chemicals. Advantageously, automation allows for the precise delivery of the right chemicals at the right time without on-site personnel and substantial cost savings over continuous injection. In other embodiments, sensor information may include information from one or more sensors 210 that are presented to user 160 with, for example, a suggested course of action or request for clarification, that user 160 may authorize or modify as user 160 sees fit. For example, control system 120 may receive sensor information and transmit to user 160 an alert or notification requesting authorization or clarification. The user 160, who may be remotely located, may view the relevant sensor information and information relating to pipeline 110 operations and transmit an authorization or a modification to the treatment information to control system 120, clarifying the user's 160 desired course of action.

System 300 may include one or more signalers 210 disposed on, in, or near pipeline 110 as required for operative use. Signalers 210 may include one or more of a pig signaler, a pump system signaler, or a chemical feed system signaler. One of ordinary skill in the art will recognize that, as opposed to sensors that sense, signalers convert a physical state or property into an actionable signal, whether mechanical or electrical, that ultimately becomes an electrical signal received by control system 120. The one or more signalers 210 may transmit, through either a wired or wireless connection, their respective signaler information to control system 120. Control system 120 may use the received signaler information, potentially in conjunction with received sensor information, to automatically, or in conjunction with the user's 160 directive, generate treatment information and transmit activation or deactivation signals to pump system 130 in accordance with the treatment information. For example, in certain embodiments, signaler information from a pig signaler may automatically trigger control system 120 to start or stop a batch treatment protocol. The signal information from the pig signaler may include, for example, information indicating that a pig (not shown) has launched down pipeline 110, information indicating that the pig (not shown) has passed a specific location of pipeline 110, or information indicating that the pig has been trapped and removed from pipeline 110. In other embodiments, signaler information corresponding to an operational state of pump system 130 may automatically trigger control system 120 to start or stop a batch treatment protocol. In still other embodiments, signaler information corresponding to a fluid level of one or more chemicals of the chemical feed system 140 may automatically trigger control system 120 to start or stop a batch treatment protocol. Advantageously, automation allows for the precise delivery of the right chemicals at the right time without on-site personnel and substantial cost savings over continuous injection. In other embodiments, signaler information may include information from one or more signalers that are presented to user 160 with, for example, a suggested course of action or request for clarification, that user 160 may authorize or modify as user 160 sees fit. For example, control system 120 may receive signaler information and transmit to user 160 an alert or notification requesting authorization or clarification. The user 160, who may be remotely located, may view the relevant sensor information and information relating to pipeline 110 operations and transmit an authorization or a modification to the treatment information to control system 120 clarifying the user's 160 desired course of action.

System 300 may include one or more sensors 210 and one or more signalers 210 disposed on, in, or near pipeline 110 as required for operative use. In certain embodiments, control system 120 may automatically generate treatment information based on one or more of sensor information and signaler information received. In other embodiments, control system 120 may generate treatment information based on one or more of sensor information, signaler information, and user 160 directives regarding prescribed courses of action based on sensor information and/or signaler information received. One of ordinary skill in the art will recognize that the generation of treatment information may vary based on the type or kind of treatment protocol to be implemented and the type or kind of available sensors 210, signalers 210, pump system 130, and chemical feed system 140 in accordance with one or more embodiments of the present invention.

In one or more embodiments of the present invention, a method of automated pipeline chemical batch treatment includes receiving treatment information at a control system 120 of pipeline 110. In certain embodiments, receiving treatment information may include receiving treatment information from a remote user 160 via cellular, satellite, radio, wireless SCADA, or other wireless communication. As such, user 160 may transmit treatment information to control system 120 from a remote location using a cell phone (not shown), a tablet (not shown), a laptop computer (not shown), or other device (not shown) capable of wirelessly transmitting the treatment information, directly or indirectly, to control system 120. For example, in certain applications, user 160 may input treatment information using a software application (not shown) that is transmitted wirelessly to control system 120. In other embodiments, receiving treatment information may include receiving treatment information from a local user 160 via an input device (not shown) of control system 120.

In certain embodiments, treatment information may include an instruction to activate pump system 130 after receipt of one or more of a pig launch signal, a pig signaler signal, or a pig trap signal. In other embodiments, treatment information may include an instruction to deactivate pump system 130 after receipt of one or more of a pig launch signal, a pig signaler signal, or a pig trap signal. In still other embodiments, treatment information may include an instruction to activate pump system 130 after receipt of a pig launch signal and an instruction to deactivate pump system 130 after receipt of a pig trap signal. In still other embodiments, treatment information may include an instruction to activate pump system 130 after receipt of a first pig signaler signal and an instruction to deactivate pump system 130 after receipt of a second pig signaler signal.

In certain embodiments where pig launcher 320 is capable of being controlled by control system 120, treatment information may include an instruction to launch pig 310 that causes control system 120 to transmit a pig launch signal via a wired or wireless connection to pig launcher 320 to deploy a pig 310 down pipeline 110. In certain embodiments where pig trap 340 is capable of being controlled by control system 120, treatment information may include an instruction to trap pig 310 that causes control system 120 to transmit a pig trap signal via a wired or wireless connection to pig trap 340 to trap and remove pig 310 from pipeline 110. Advantageously, in such embodiments, control system 120 may control, in addition to pump system 130, pig launcher 320 and pig trap 330, allowing for completely automated and integrated pigging and chemical treatment operations. Control system 120 may, based on sensor or signaler information, a user directive, or programming to implement various treatment protocols that integrate both pigging operations and chemical treatment operations.

In certain embodiments, control system 120 may start a chemical treatment operation by activating pump system 120 after receipt of a pig launch signal or a first pig signaler signal such that the chemical treatment is provided behind a pig 310. Control system 120 may deactivate pump system 120 after a predetermined time has elapsed, a predetermined amount of one or more chemicals have been deployed, or receipt of a second pig signaler signal or pig trap signal or a user 160 directive. In other embodiments, control system 120 may start a chemical treatment operation by activating pump system 120 based on treatment information before a pig 310 is launched. Control system 120 may deactivate pump system 120 after a predetermined time has elapsed, a predetermined amount of one or more chemicals have been deployed, or receipt of a pig launch signal or pig signaler signal or a user 160 directive. In still other embodiments, control system 120 may start a chemical treatment operating by activating pump system 120 based on treatment information and launching a pig 310 at approximately the same time such that the pigging operation and chemical operation are performed at substantially the same time. Control system 120 may start a chemical treatment operation by activating pump system 120 based on treatment information, whether based on sensor or signaler information, activation criteria, or a user 160 directive. Control system 120 may deactivate pump system 120 after a predetermined time has elapsed, a predetermined amount of one or more chemicals have been deployed, or receipt of a pig launch signal, pig signaler signal, or pig trap signal, or a user 160 directive.

In certain embodiments, treatment information may include sensor information or signaler information received by control system 120. Sensor or signaler information may constitute or include activation or deactivation criteria. In certain embodiments, the activation or deactivation criteria may independently be actionable by control system 120. In other embodiments, control system 120 may generate additional treatment information based on the sensor or signaler information or the activation or deactivation criteria. For example, sensor information indicating a value associated with sensed corrosion, pressure, temperature, wall thickness, electrical resistance, magnetic flux leakage, electromagnetics, or other such data, may be calibrated such that control system 120 may treat such information as activation or deactivation criteria. For example, sensor information indicating pipe wall loss, deposition, or corrosion values that exceeds a threshold value may be treated as activation criteria. Similarly, pipe wall loss, deposition, or corrosion values that fall below a threshold value may be treated as deactivation criteria. Control system 120 may activate and deactivate pump system 130 in accordance with the activation and deactivation criteria. One of ordinary skill in the art will recognize that the values of the data, the thresholds that trigger action, and the actions taken, will vary based on the treatment protocol, application, and design in accordance with one or more embodiments of the present invention.

In certain embodiments, treatment information may include an instruction to activate pump system 130 in accordance with one or more activation criteria and an instruction to deactivate pump system 130 in accordance with one or more deactivation criteria. In other embodiments, treatment information may include an instruction to activate pump system 130 in accordance with one or more activation criteria and deactivate pump system 130 after a predetermined amount of time has elapsed. In still other embodiments, treatment information may include an instruction to activate pump system 130 in accordance with one or more activation criteria and deactivate pump system 130 after a predetermined amount of one or more chemicals (not shown) from the chemical feed system 140 have been deployed into the lumen of pipeline 110.

In certain embodiments, treatment information may include one or more of an instruction to activate pump system 130 and an instruction to deactivate pump system 130. In other embodiments, treatment information may include an instruction to activate pump system 130 and an instruction to deactivate pump system 130 after a predetermined amount of time has elapsed. In still other embodiments, treatment information may include an instruction to activate pump system 130 and an instruction to deactivate pump system 130 after a predetermined amount of one or more chemicals (not shown) from the chemical feed system 140 have been deployed into the lumen of pipeline 110. Pump system 130 may provide control system 120 with information used by control system 120, directly or indirectly, to determine if the predetermined amount has been deployed. For example, pump system 130 may provide an amount of flow therethrough directly used by control system 120 or information relating to activation and deactivation and a flow rate that may be used by control system 120 to calculate whether the predetermined amount has been deployed.

In certain embodiments, treatment information may include a time or a time and date for control system 120 to send an activation signal to pump system 130. In other embodiments, treatment information may include a time or a time and date for control system 120 to send a deactivation signal to pump system 130. In still other embodiments, treatment information may include a time to deactivate pump system 130 that is a predetermined amount of time after activation. In still other embodiments, treatment information may include a directive to deactivate pump system 130 after a predetermined amount of one or more chemicals (not shown) have been deployed into pipeline 110.

If the treatment information includes an instruction to activate pump system 130, control system 120 may transmit an activation signal from control system 120 to pump system 130 in accordance with the treatment information that causes pump system 130 to pump one or more chemicals (not shown) from chemical feed system 140 into pipeline 110. Similarly, if the treatment information includes an instruction to deactivate pump system 130, control system 120 may transmit a deactivation signal from control system 120 to pump system 130 in accordance with the treatment information that causes pump system 130 to stop pumping one or more chemicals (not shown) into pipeline 110. Control system 120 may transmit the activation and deactivation signals to pump system 130 over a wired or wireless connection.

The activation signal may cause pump system 130 to start pumping one or more chemicals (not shown) from chemical feed system 140 into the lumen of pipeline 110. One of ordinary skill in the art will recognize that the form or protocol of the activation signal may vary with the type or kind of control system 120 and pump system 130 used in accordance with one or more embodiments of the present invention. Similarly, the deactivation signal may cause pump system 130 to stop pumping one or more chemicals (not shown) from chemical feed system 140 into the lumen of pipeline 110. One of ordinary skill in the art will also recognize that the form or protocol of the deactivation signal may vary with the type or kind of control system 120 and pump system 130 used in accordance with one or more embodiments of the present invention.

Notwithstanding the above, a method of automated pipeline chemical batch treatment using a system (e.g., 100, 200, 300), may receive treatment information including activation criteria and deactivation criteria at a control system 120 of pipeline 110. A pump system 130 may be activated in accordance with the activation criteria. Similarly, pump system 130 may be deactivated in accordance with the deactivation criteria. The activation criteria may include a user 160 instruction to activate, a user 160 instruction to activate at a specific time, a user 160 instruction to activate on a specific date, a sensor (e.g., 210 of systems 200 and 300) signal constituting or interpreted as an instruction to activate, or a signaler (e.g., 210 of systems 200 and 300) signal constituting or interpreted as an instruction to activate. The deactivation criteria may include a user 160 instruction to deactivate, a user 160 instruction to deactivate at a specific time, a user 160 instruction to deactivate on a specific date, a sensor (e.g., 210 of systems 200 and 300) signal constituting or interpreted as an instruction to deactivate, or a signaler (e.g., 210 of systems 200 and 300) signal constituting or interpreted as an instruction to deactivate.

Figure 4:
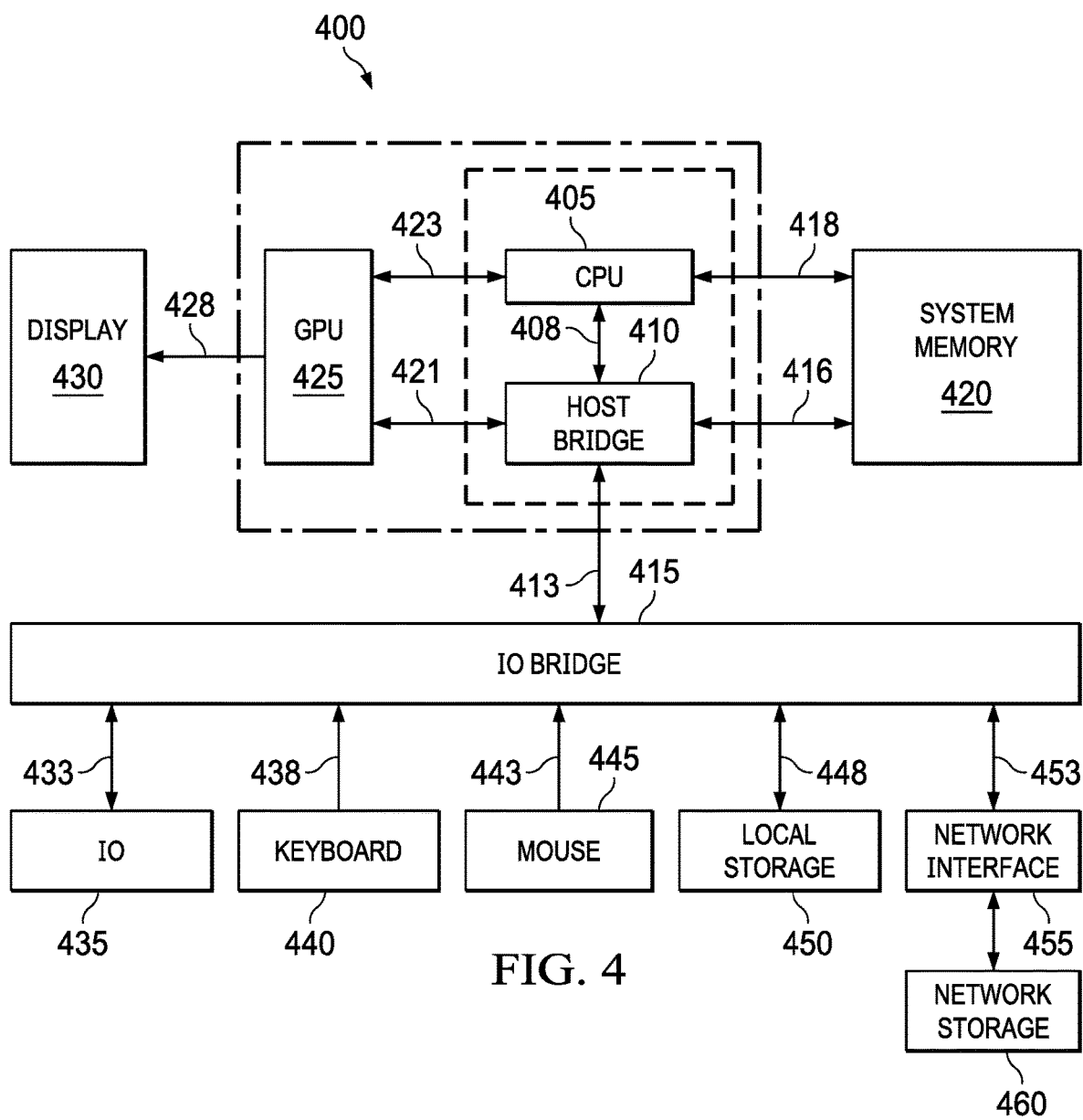
FIG. 4 shows a control system of an automated pipeline chemical batch treatment system in accordance with one or more embodiments of the present invention.

FIG. 4 shows a control system 400 of an automated pipeline chemical batch treatment system (e.g., 100, 200, 300) in accordance with one or more embodiments of the present invention. Control system 400 may be a modification of an already existing control system located on site at a pipeline (e.g., 110) so long as it is capable of transmitting and receiving signals as discussed herein. For example, control system 400 must include an input/output ("IO") interface (e.g., 435) capable of transmitting and potentially receiving signals from the pump system (e.g., 130) relating to activation and deactivation of the pump system (e.g., 130), capable of receiving signals from one or more sensors or signalers (e.g., 210), and in certain embodiments, the ability to transmit signals to a pig launcher (e.g., 320) or pig trap (e.g., 340). One of ordinary skill in the art will recognize that the signaling interfaces, and protocols, may vary based on the type or kind of equipment used for a particular application or design in accordance with one or more embodiments of the present invention.

Control system 400 may include one or more central processing units (singular "CPU" or plural "CPUs") 405, host bridge 410, IO bridge 415, graphics processing units (singular "GPU" or plural "GPUs") 425, and/or application-specific integrated circuits (singular "ASIC" or plural "ASICs") (not shown) disposed on one or more printed circuit boards (not shown) that perform computational operations. Each of the one or more CPUs 405, GPUs 425, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 405 may be a general-purpose computational device typically configured to execute software instructions. CPU 405 may include an interface 408 to host bridge 410, an interface 418 to system memory 420, and an interface 423 to one or more IO devices, such as, for example, one or more GPUs 425. GPU 425 may serve as a specialized computational device typically configured to perform graphics functions related to frame buffer manipulation. However, one of ordinary skill in the art will recognize that GPU 425 may be used to perform non-graphics related functions that are computationally intensive. In certain embodiments, GPU 425 may interface 423 directly with CPU 425 (and interface 418 with system memory 420 through CPU 405). In other embodiments, GPU 425 may interface 421 with host bridge 410 (and interface 416 or 418 with system memory 420 through host bridge 410 or CPU 405 depending on the application or design). In still other embodiments, GPU 425 may interface 433 with IO bridge 415 (and interface 416 or 418 with system memory 420 through host bridge 410 or CPU 405 depending on the application or design). The functionality of GPU 425 may be integrated, in whole or in part, with CPU 405.

Host bridge 410 may be an interface device that interfaces between the one or more computational devices and IO bridge 415 and, in some embodiments, system memory 420. Host bridge 410 may include an interface 408 to CPU 405, an interface 413 to IO bridge 415, for embodiments where CPU 405 does not include an interface 418 to system memory 420, an interface 416 to system memory 420, and for embodiments where CPU 405 does not include an integrated GPU 425 or an interface 423 to GPU 425, an interface 421 to GPU 425. The functionality of host bridge 410 may be integrated, in whole or in part, with CPU 405. IO bridge 415 may be an interface device that interfaces between the one or more computational devices and various IO devices (e.g., 440, 445) and IO expansion, or add-on, devices (not independently illustrated). IO bridge 415 may include an interface 413 to host bridge 410, one or more interfaces 433 to one or more IO expansion devices 435, an interface 438 to keyboard 440, an interface 443 to mouse 445, an interface 448 to one or more local storage devices 450, and an interface 453 to one or more network interface devices 455. The functionality of IO bridge 415 may be integrated, in whole or in part, with CPU 405 or host bridge 410. Each local storage device 450, if any, may be a solid-state memory device, a solid-state memory device array, a hard disk drive, a hard disk drive array, or any other non-transitory computer readable medium. Network interface device 455 may provide one or more network interfaces including any network protocol suitable to facilitate networked communications.

Control system 400 may include one or more network-attached storage devices 460 in addition to, or instead of, one or more local storage devices 450. Each network-attached storage device 460, if any, may be a solid-state memory device, a solid-state memory device array, a hard disk drive, a hard disk drive array, or any other non-transitory computer readable medium. Network-attached storage device 460 may or may not be collocated with control system 400 and may be accessible to control system 400 via one or more network interfaces provided by one or more network interface devices 455.

One of ordinary skill in the art will recognize that control system 400 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 405, host bridge 410, or GPU 425 or interface through IO bridge 415. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 405, host bridge 410, IO bridge 415, or GPU 425. In such systems, the one or more ASICs may incorporate sufficient functionality to perform certain network and computational functions in a minimal footprint with substantially fewer component devices.

As such, one of ordinary skill in the art will recognize that CPU 405, host bridge 410, IO bridge 415, GPU 425, or ASIC (not shown) or a subset, superset, or combination of functions or features thereof, may be integrated, distributed, or excluded, in whole or in part, based on an application, design, or form factor in accordance with one or more embodiments of the present invention. Thus, the description of control system 400 is merely exemplary and not intended to limit the type, kind, or configuration of component devices that constitute a control system 400 suitable for performing computing operations in accordance with one or more embodiments of the present invention. Notwithstanding the above, one of ordinary skill in the art will recognize that control system 400 may be a standalone, laptop, desktop, server, blade, rack mountable, or industrial system and may vary based on an application or design.

Advantages of one or more embodiments of the present invention may include one or more of the following:

In one or more embodiments of the present invention, a method and system for automated pipeline chemical batch treatment reduces or eliminates field operations that would otherwise have to be planned, coordinated, and performed on site of a pipeline and increases the safety and effectiveness of flow assurance and pipeline integrity operations.

In one or more embodiments of the present invention, a method and system for automated pipeline chemical batch treatment provides the right chemicals, at the right time, and in the right amount to a lumen of a pipeline in accordance with a user directive, automatically based upon treatment information received or generated, or upon user acknowledgment, and potentially modification, of an automatically determined course of treatment proposed by a control system.

In one or more embodiments of the present invention, a method and system for automated pipeline chemical batch treatment allows for automated application of various chemistries including inhibitors, biocides, scavengers, dissolvers (e.g., iron scales), surfactants, dispersants, cleaning agents, anti-freeze, or other treatment-specific chemistries that seek to prevent corrosion, kill bacteria, remove deposits, or preventatively treat or coat the inner walls of the pipeline.

In one or more embodiments of the present invention, a method and system for automated pipeline chemical batch treatment automates batch chemical treatment operations of a pipeline.

In one or more embodiments of the present invention, a method and system for automated pipeline chemical batch treatment automates batch chemical treatment operations and pigging operations of a pipeline.

In one or more embodiments of the present invention, a method and system for automated pipeline chemical batch treatment integrates chemical treatment operations with pigging operations to achieve optimal delivery of treatment and pigging for flow assurance and pipeline integrity. Chemical treatment may be provided before, during, or after pigging operations depending on the approach required by the specific treatment protocol.

In one or more embodiments of the present invention, a method and system for automated pipeline chemical batch treatment reduces the requirement of personnel on site for chemical treatment operations and chemical treatment operations and pigging operations.

In one or more embodiments of the present invention, a method and system for automated pipeline chemical batch treatment reduces costs of deployment of expensive chemicals over continuous injection.

In one or more embodiments of the present invention, a method and system for automated pipeline chemical batch treatment reduces costs associated with having personnel on site for chemical treatment operations or pigging operations.

In one or more embodiments of the present invention, a method and system for automated pipeline chemical batch treatment reduces maintenance costs associated with flow assurance and pipeline integrity operations.

In one or more embodiments of the present invention, a method and system for automated pipeline chemical batch treatment reduces total operating costs associated with flow assurance and pipeline integrity operations.

In one or more embodiments of the present invention, a method and system for automated pipeline chemical batch treatment improves the effectiveness of flow assurance and pipeline integrity operations.

In one or more embodiments of the present invention, a method and system for automated pipeline chemical batch treatment increases the safety of flow assurance and pipeline integrity operations.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of automated pipeline chemical batch treatment comprising:
   receiving treatment information at a control system configured to control a pump system to controllably deliver one or more chemicals to prevent internal corrosion and/or clean inner walls of a pipeline from a chemical feed system to an interior passageway of the pipeline;
   if the treatment information comprises an instruction to activate the pump system, transmitting an activation signal from the control system to the pump system in accordance with the treatment information, wherein the activation signal causes the pump system to pump the one or more chemicals from the chemical feed system into the pipeline; or
   if the treatment information comprises an instruction to deactivate the pump system, transmitting a deactivation signal from the control system to the pump system in accordance with the treatment information, wherein the deactivation signal causes the pump system to stop pumping the one or more chemicals from the chemical feed system into the pipeline,
   wherein the treatment information comprises activation criteria or deactivation criteria that enable the control system to preemptively treat the inner walls of the pipeline with one or more chemicals to prevent internal corrosion and/or clean the inner walls of the pipeline automatically, without on-site personnel, and without continuous injection of the one or more chemicals.

2. The method of claim 1, wherein receiving treatment information comprises receiving treatment information from a user remotely via cellular, satellite, radio, wireless Supervisory Control and Data Acquisition, or other wireless communication.

3. The method of claim 1, wherein receiving treatment information comprises receiving information from a sensor or signaler disposed on or in the pipeline interpreted as treatment information by the control system.

4. The method of claim 3, wherein the sensor comprises a corrosion sensor or a corrosion probe.

5. The method of claim 4, wherein treatment information comprises instructions generated by the control system based on real-time sensor or signaler data.

6. The method of claim 3, wherein the signaler comprises a pig signaler.

7. The method of claim 3, wherein the sensor comprises a pressure sensor.

8. The method of claim 3, wherein the sensor comprises a temperature sensor.

9. The method of claim 3, wherein the sensor comprises a wall thickness sensor.

10. The method of claim 3, wherein the sensor comprises a fluid level sensor.

11. The method of claim 3, wherein the sensor comprises a magnetic flux leakage sensor.

12. The method of claim 3, wherein the sensor comprises an electromagnetic acoustic transducer.

13. The method of claim 3, wherein the sensor comprises a flow sensor.

14. The method of claim 3, wherein the signaler comprises a pump system signaler.

15. The method of claim 3, wherein the signaler comprises a chemical feed system signaler.

16. The method of claim 1, wherein receiving treatment information comprises receiving treatment information from a user via an input device of the control system.

17. The method of claim 1, wherein treatment information comprises one or more of an instruction to activate the pump system and an instruction to deactivate the pump system.

18. The method of claim 1, wherein treatment information comprises an instruction to activate the pump system and deactivate the pump system after a predetermined amount of time.

19. The method of claim 1, wherein treatment information comprises an instruction to activate the pump system and deactivate the pump system after a predetermined amount of one or more chemicals have been deployed.

20. The method of claim 1, wherein treatment information comprises an instruction to activate the pump system in accordance with one or more activation criteria and an instruction to deactivate the pump system in accordance with one or more deactivation criteria.

21. The method of claim 1, wherein treatment information comprises an instruction to activate the pump system in accordance with one or more activation criteria and deactivate the pump system after a predetermined amount of time.

22. The method of claim 1, wherein treatment information comprises an instruction to activate the pump system in accordance with one or more activation criteria and deactivate the pump system after a predetermined amount of one or more chemicals have been deployed.

23. The method of claim 1, wherein treatment information comprises one or more of an instruction to activate the pump system after receipt of a pig launch signal, a pig signaler signal, or a pig trap signal.

24. The method of claim 1, wherein treatment information comprises one or more of an instruction to deactivate the pump system after receipt of a pig launch signal, a pig signaler signal, or a pig trap signal.

25. The method of claim 1, wherein treatment information comprises an instruction to activate the pump system after receipt of a pig launch signal indicating that a pipeline pig has been launched.

26. The method of claim 1, wherein treatment information comprises an instruction to deactivate the pump system after receipt of a pig trap signal indicating that a pipeline pig has been trapped.

27. The method of claim 1, wherein treatment information comprises an instruction to activate the pump system after receipt of a pig launch signal indicating that a pipeline pig has been launched and an instruction to deactivate the pump system after receipt of a pig trap signal indicating that the pipeline pig has been trapped.

28. The method of claim 1, wherein treatment information comprises an instruction to activate the pump system after receipt of a first pig signaler signal and an instruction to deactivate the pump system after receipt of a second pig signaler signal.

29. The method of claim 1, further comprising:
if the treatment information comprises an instruction to launch a pig, transmitting a pig launch signal from the control system to a pig launcher system, wherein the pig launch signal causes the pig launcher system to deploy a pig down the pipeline.

30. The method of claim 1, wherein treatment information comprises a time and date to transmit the activation signal.

31. The method of claim 1, wherein treatment information comprises a time to and date to transmit the deactivation signal.

32. The method of claim 1, wherein treatment information comprises a directive to transmit the deactivation signal a predetermined amount of time after activation.

33. The method of claim 1, wherein treatment information comprises a directive to transmit the deactivation signal after a predetermined amount of one or more chemicals have been deployed into the pipeline.

34. The method of claim 1, wherein the one or more chemicals comprise one or more corrosion treatment, paraffin treatment, or asphaltene treatment.

35. The method of claim 1, wherein the one or more chemicals comprise one or more biocides, scavengers, or dissolvers.

36. The method of claim 1, wherein the one or more chemicals comprise one or more surfactants, dispersants, cleaning agents, or chelant.

* * * * *